Nov. 1, 1949     R. A. SCHAFER ET AL     2,486,988

HYDRAULIC CONTROL APPARATUS FOR MACHINE TOOLS

Filed April 29, 1946     13 Sheets-Sheet 1

INVENTORS:
Robert A. Schafer
Ralph B. Rodal
By
Hinkle, Horton, Ahlberg, Hanemann & Kupper
Attorneys Nov. 1, 1949 R. A. SCHAFER ET AL 2,486,988
HYDRAULIC CONTROL APPARATUS FOR MACHINE TOOLS
Filed April 29, 1946 13 Sheets-Sheet 2

INVENTORS:
Robert A. Schafer
Ralph B. Rodal
By Hinkle, Horton, Ahlberg, Hanemann & Kupper
Attorneys.

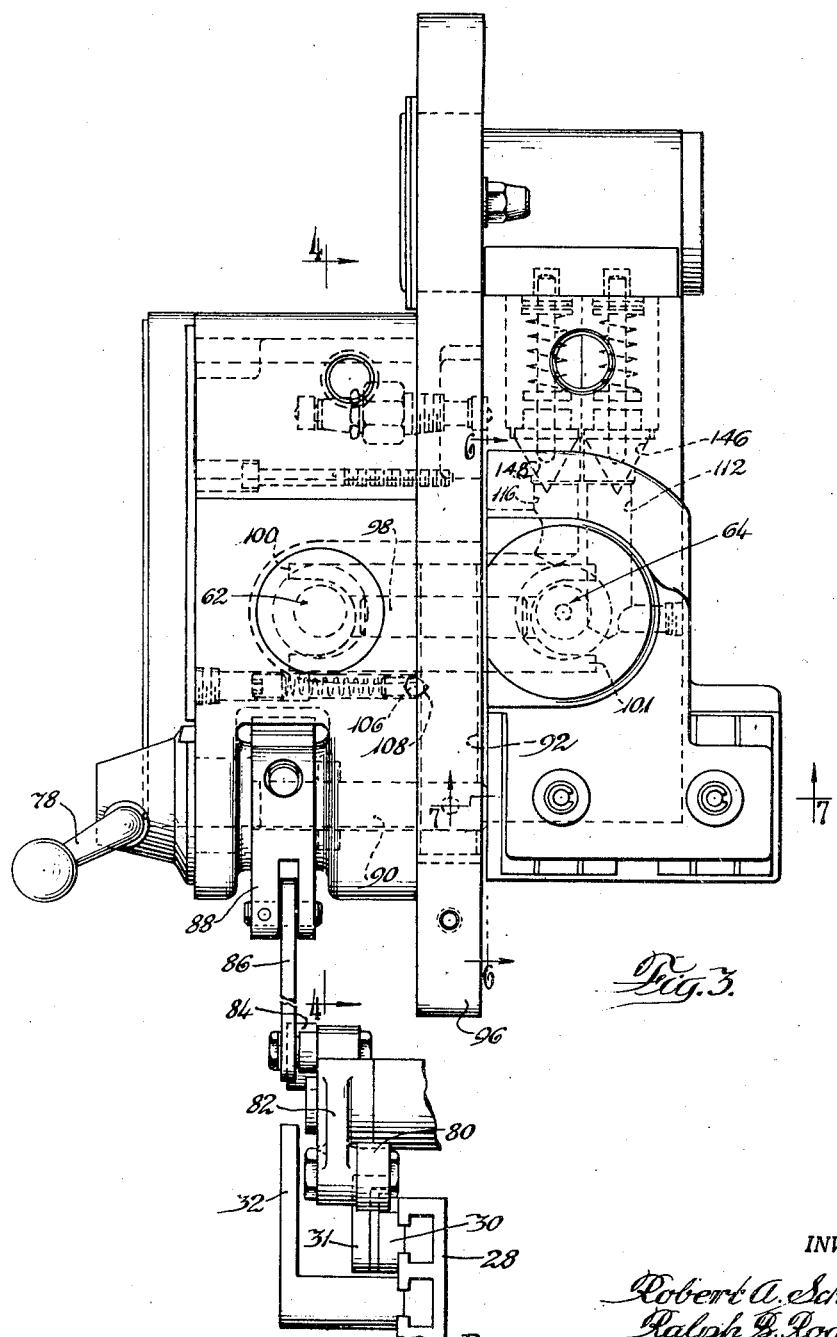

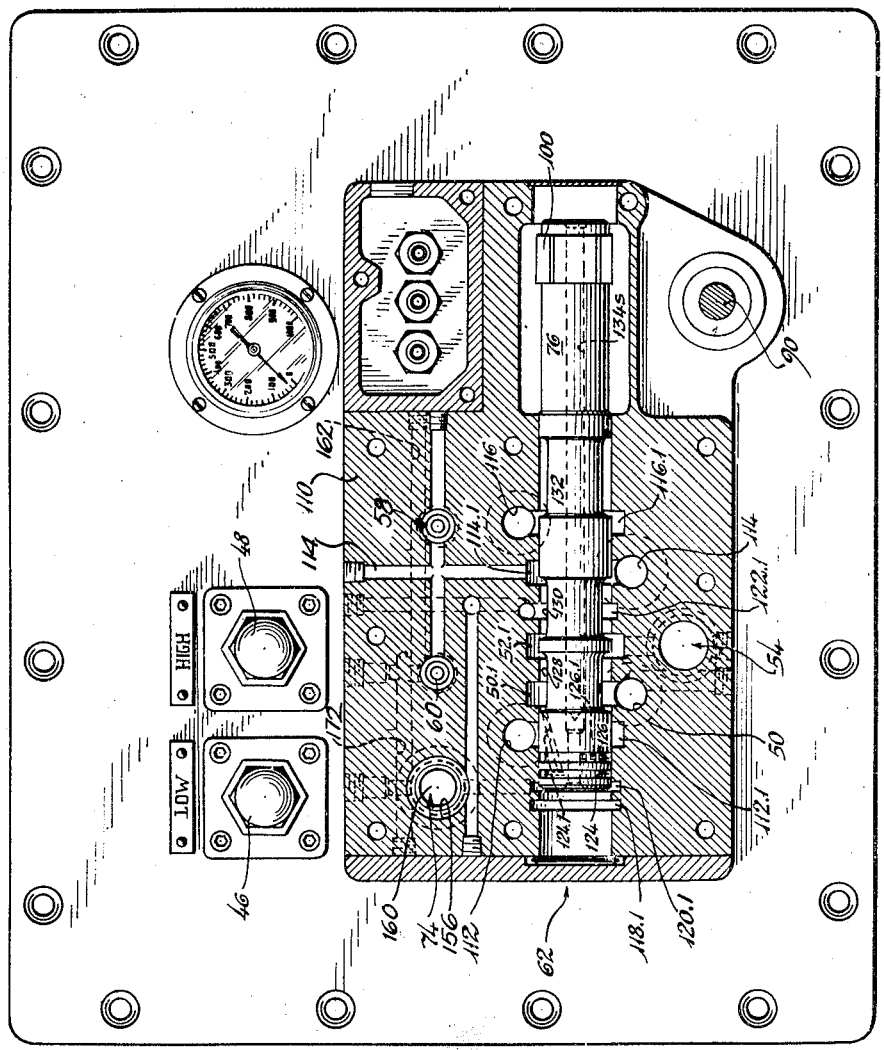

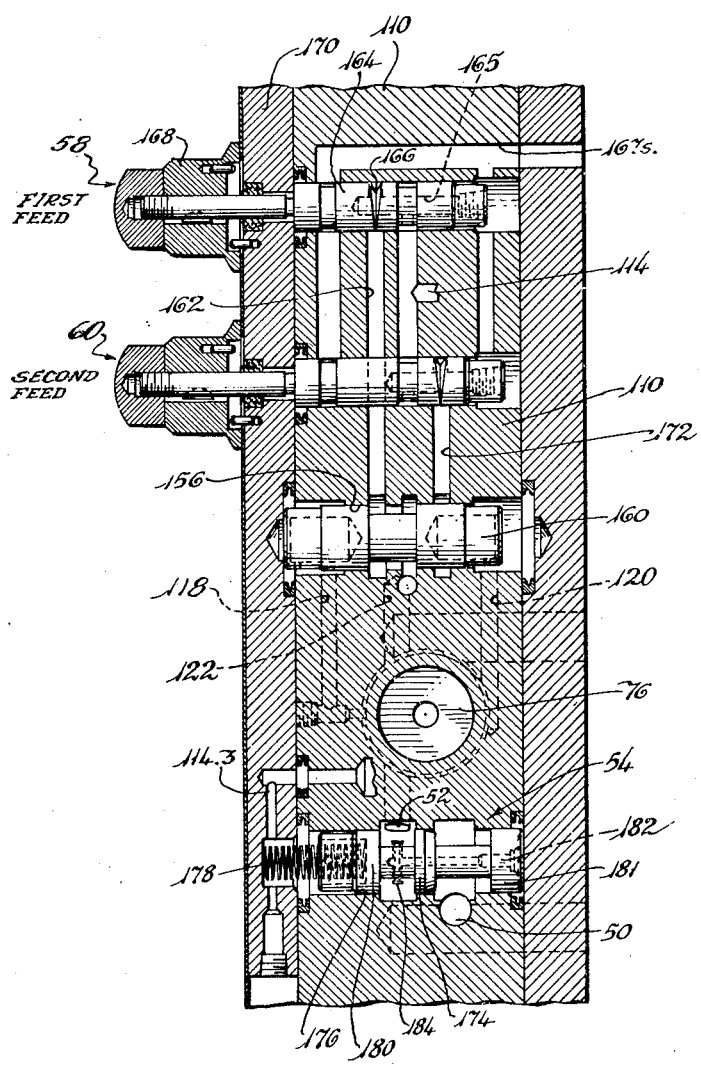

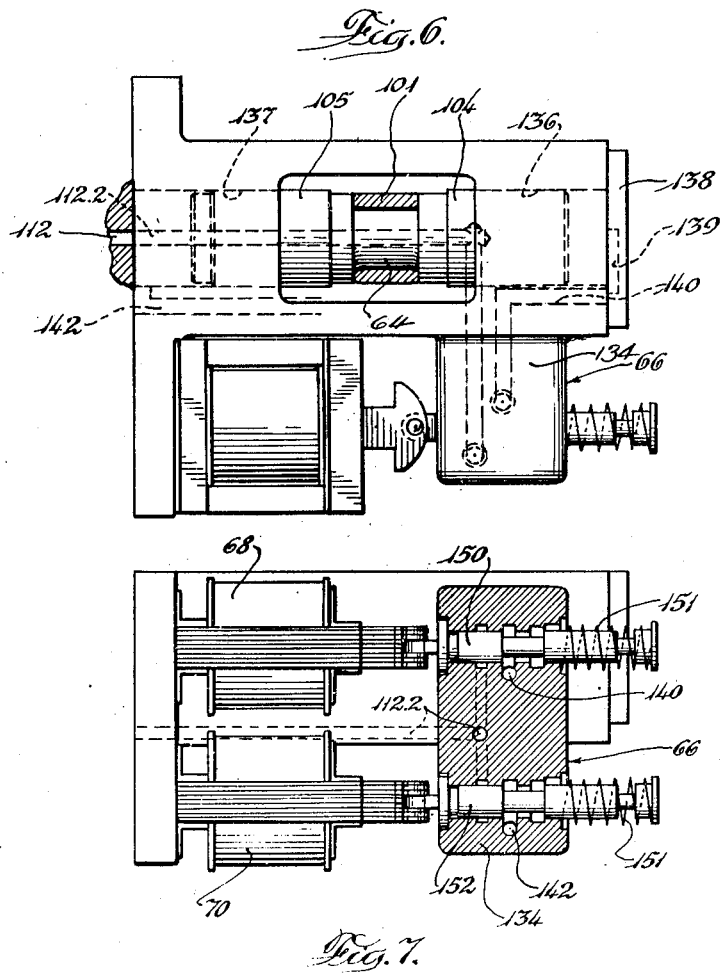

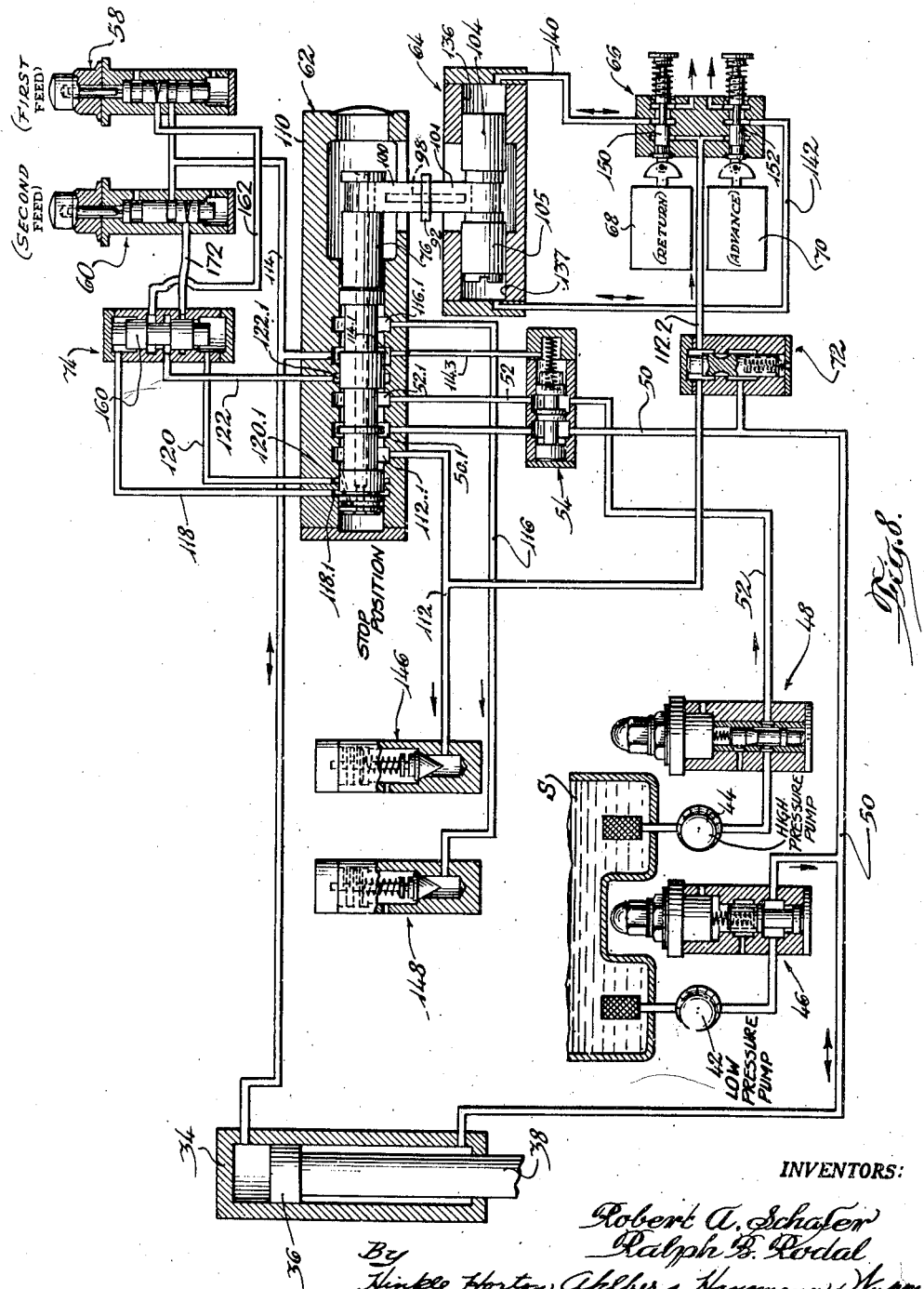

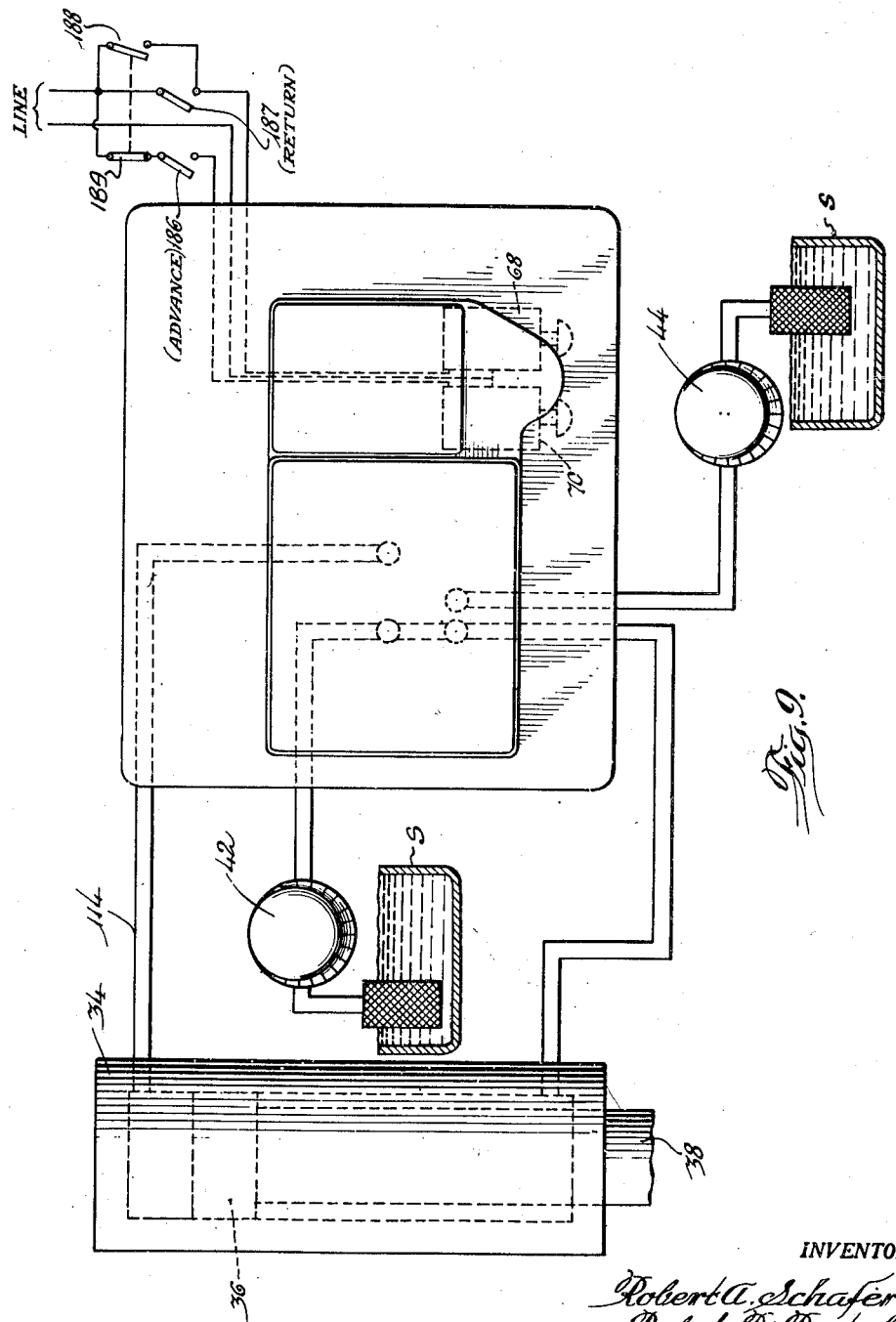

Nov. 1, 1949   R. A. SCHAFER ET AL   2,486,988
HYDRAULIC CONTROL APPARATUS FOR MACHINE TOOLS
Filed April 29, 1946   13 Sheets-Sheet 10

INVENTORS:
Robert A. Schafer
Ralph B. Rodal
By Hinkle, Horton, Ahlberg, Hausmann & Nipper
Attorneys

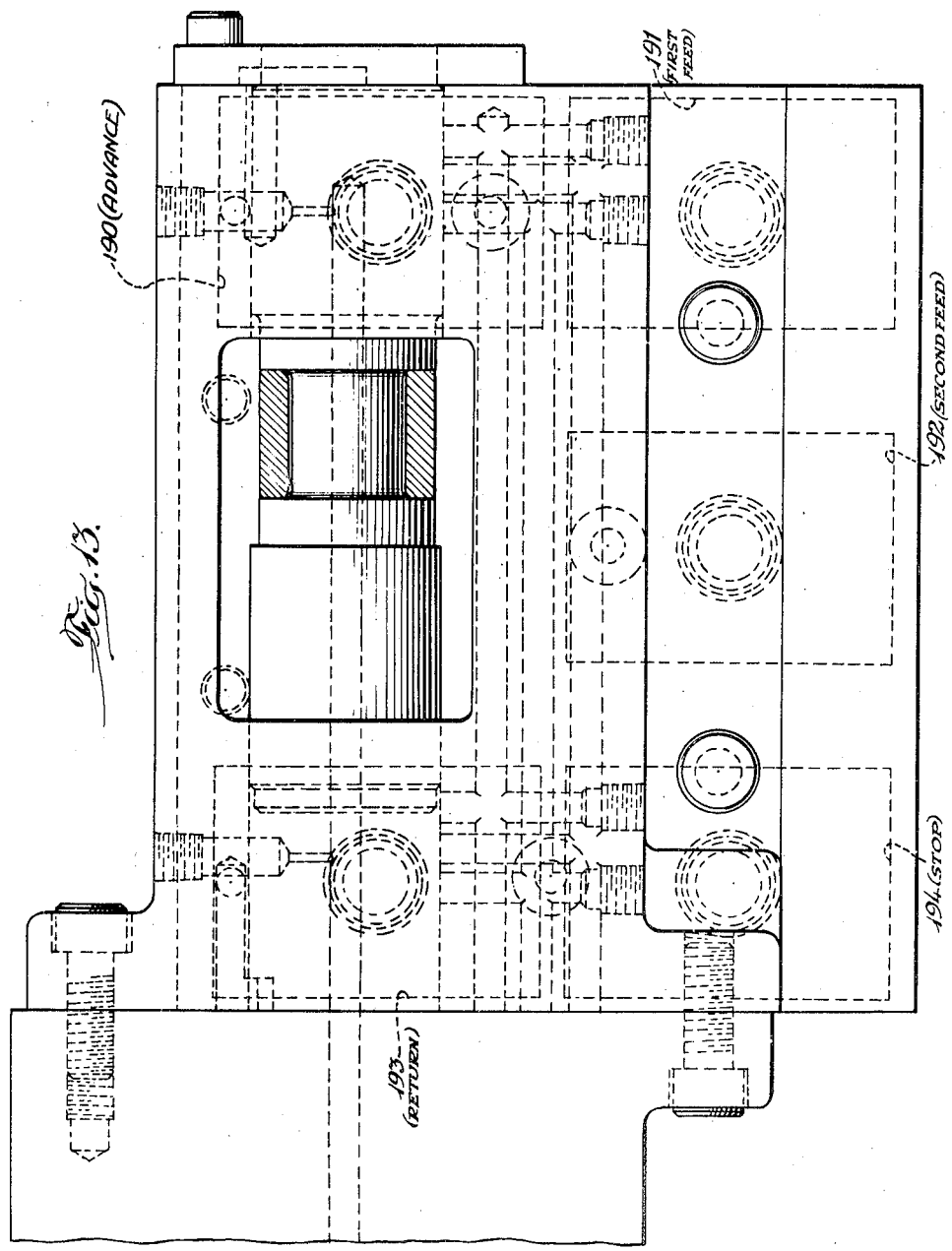

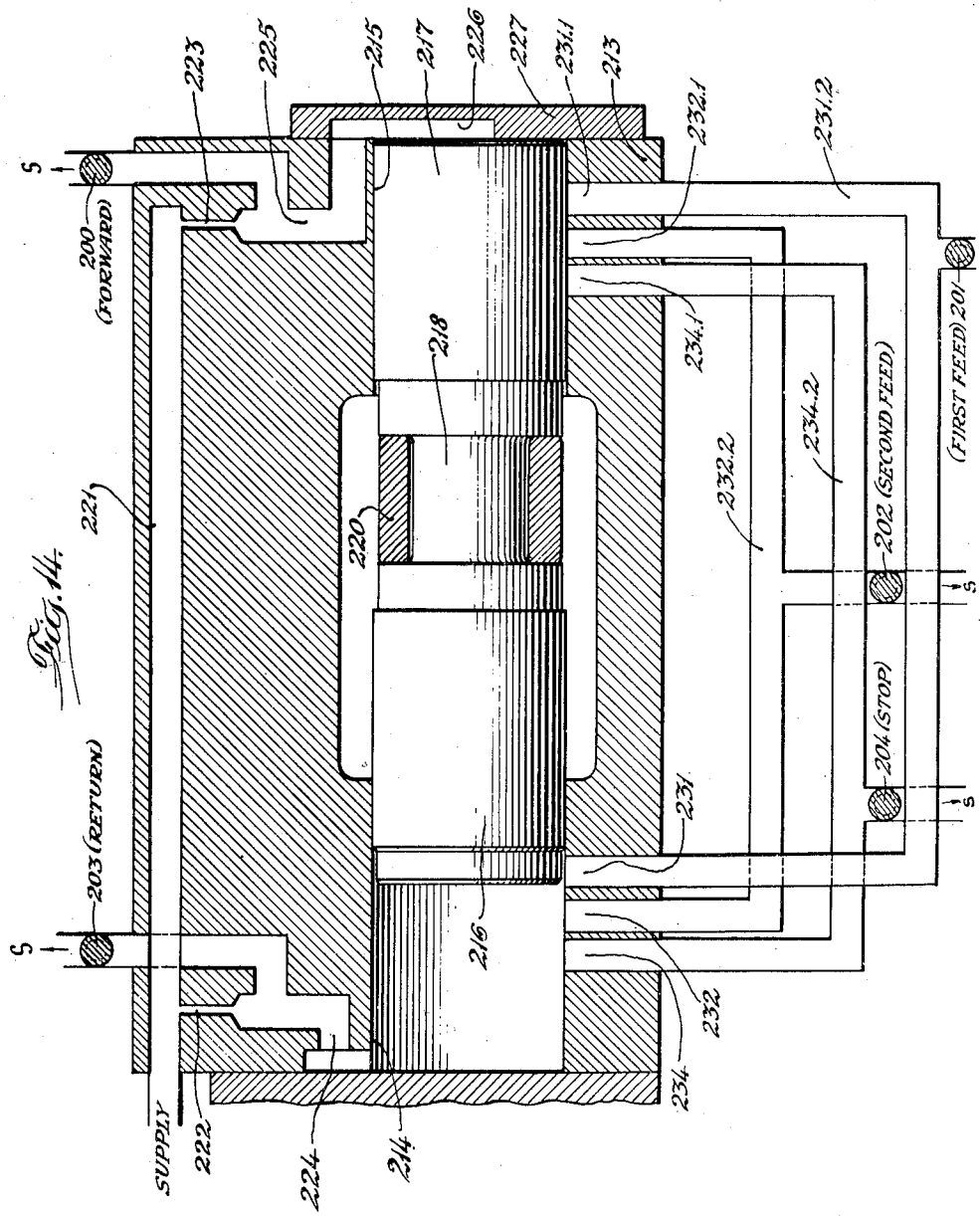

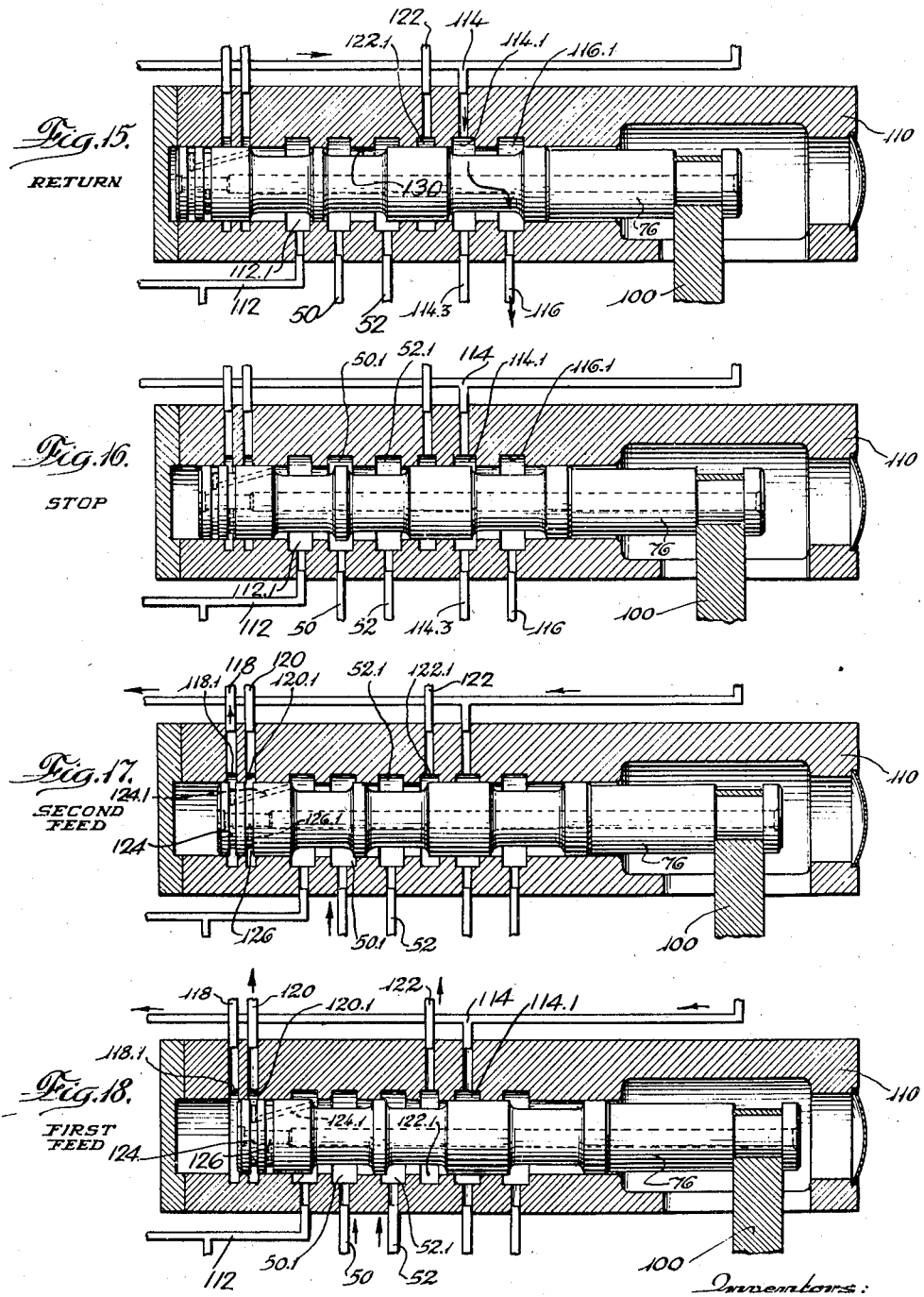

Patented Nov. 1, 1949

2,486,988

UNITED STATES PATENT OFFICE 2,486,988

HYDRAULIC CONTROL APPARATUS FOR MACHINE TOOLS

Robert A. Schafer and Ralph B. Rodal, Richmond, Ind., assignors to National Automatic Tool Company, Inc., Richmond, Ind., a corporation of Indiana Application April 29, 1946, Serial No. 665,874

11 Claims. (Cl. 60—52)

Our invention relates generally to machine tools, and more particularly to improved hydraulic controls therefor.

It is an object of our invention to provide an improved hydraulic control mechanism for machine tools, such as drilling, boring, and similar machines, by which a more positive control of the machine cycle may be obtained.

A further object is to provide an improved hydraulic control mechanism for machine tools of the above mentioned type, in which the hydraulic control parts are readily accessible for inspection, adjustment, and replacement.

A further object is to provide an improved hydraulic control mechanism for machine tools, having an optionally usable manual control for causing the machine tool to operate through any selected portion of the cycle under manual control.

A further object is to provide an improved hydraulic mechanism for an optionally usable manual control, in which there is a positive positioning connection between the manual control and the ultimate hydraulic control valve, whereby positiveness in operation of the hydraulic control is effected through the manual control.

Other objects will appear from the following description, reference being had to the accompanying drawings, in which:

Fig. 3 is an end elevational view of the hydraulic control panel, as seen from the right of Fig. 2;

Fig. 4 is a sectional view of the control panel, taken on the line 4—4 of Fig. 3, showing particularly the directional valve in "Advance" position;

Fig. 5 is a broken sectional view, taken on the line 5—5 of Fig. 2;

Figure 11:
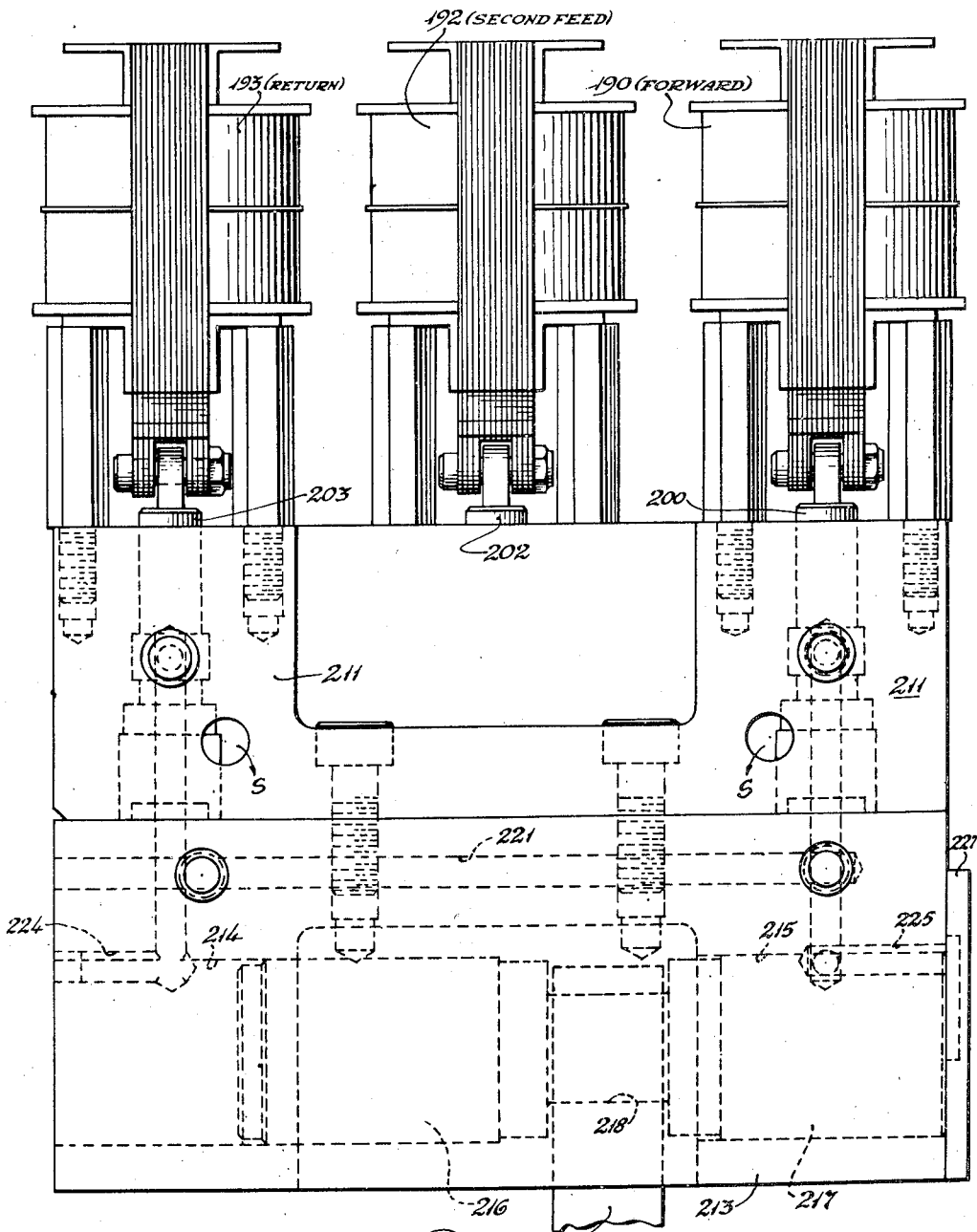
Figure 12:
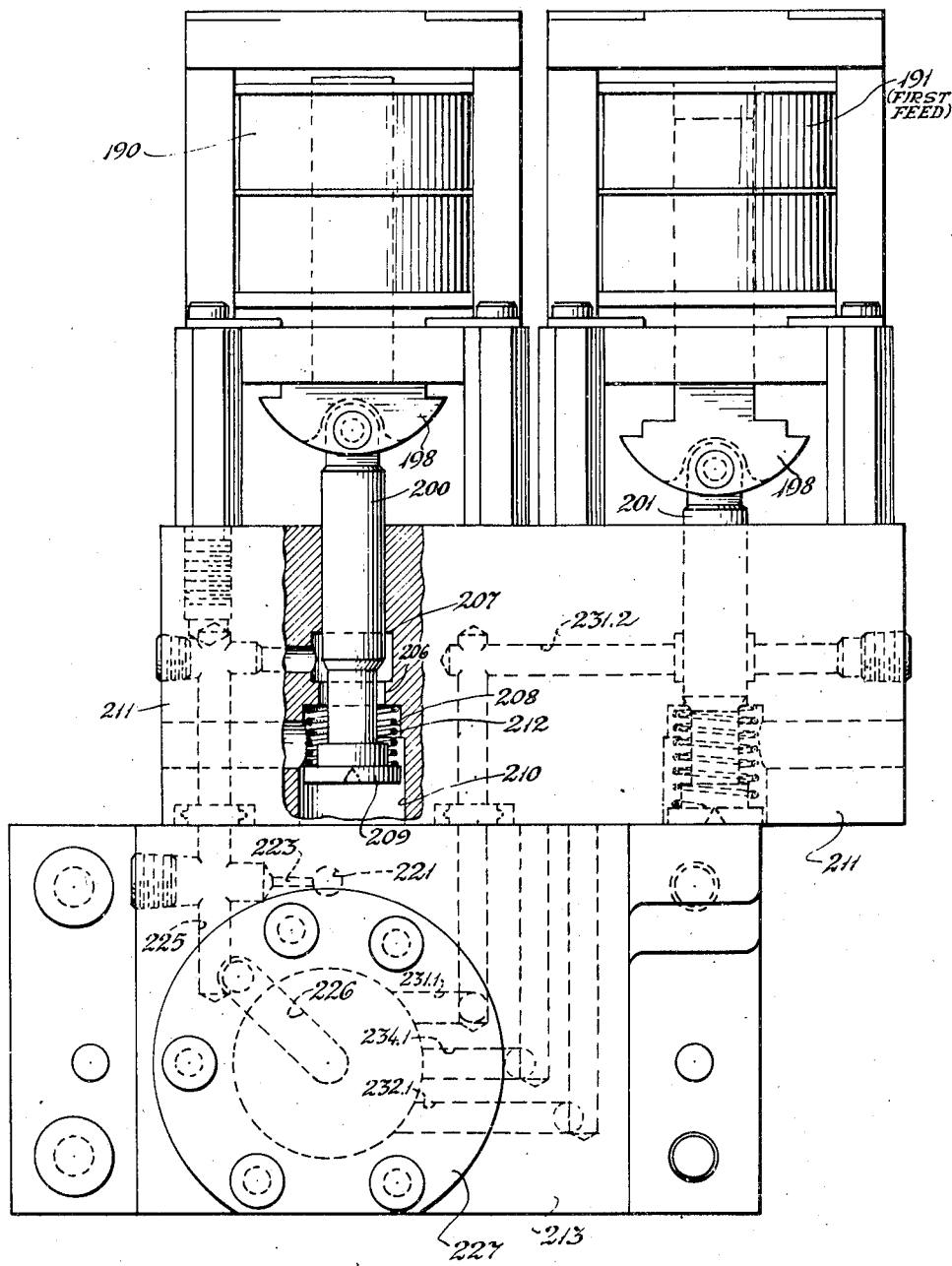

Figs. 6 and 7 are sectional views, taken on the lines 6—6 and 7—7 of Fig. 3, showing the solenoid operated valves;

Fig. 8 is a schematic diagram showing the hydraulic system;

Fig. 9 is a schematic diagram showing the electrical circuits and external connections to the hydraulic control panel;

Fig. 10 is a fragmentary elevational view of the machine, showing the dog operated limit switches;

Fig. 11 is a front elevational view of a modified form of directional valve positioning motor;

Fig. 12 is a right side elevational view thereof, as seen from the right of Fig. 11;

Fig. 13 is a bottom plan view of the apparatus shown in Fig. 11;

Fig. 14 is a schematic diagram illustrating the operation of the modified form of directional valve positioning motor; and Figs. 15, 16, 17, and 18 are fragmentary sectional views of the directional valve, showing it in "Return," "Stop," "Second feed," and "First feed" positions.

General description

Figure 1:
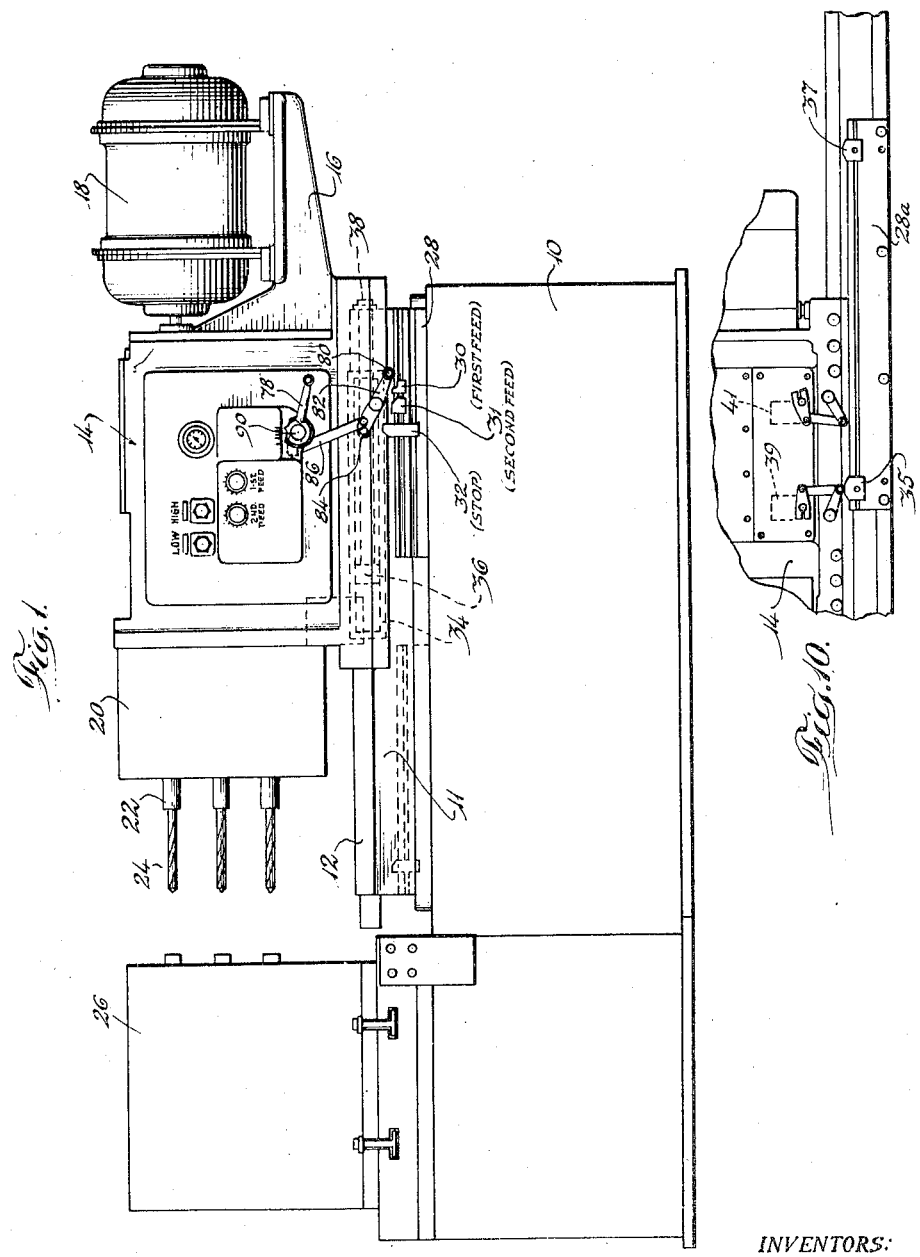
Fig. 1 is a side elevational view of a machine tool incorporating the improved hydraulic control mechanism.

The invention is illustrated as applied to a drilling machine shown generally in Fig. 1 as comprising a bed 10 having a secondary bed 11 provided with ways 12, upon which a head assembly 14 is mounted for reciprocatory movement in the customary manner. The head has a motor mounting bracket 16 secured thereto, carrying a spindle driving motor 18. A drill gear box 20 is secured to the head 14 and contains suitable gearing for driving spindles 22 carrying cutting tools illustrated as drills 24 for operation upon a workpiece 26.

Suitably secured to the bed 11 is a T-slot or dog bracket 28 provided, as is customary, with a plurality of T-slots in which a plurality of cams or dogs 30, 31, and 32 are adjustably positioned. A bracket 28a, similar to the T-slot bracket 28, is mounted upon the opposite side of the bed 11, as shown in Fig. 10, for the support of adjustable "Stop" and "Reserve" dogs 35 and 37 utilized to operate limit switches 39 and 41, respectively, carried by the head 14.

The head 14 is traversed by a hydraulic motor comprising a cylinder 34 carried by the head, in which a piston 36 is reciprocable, the piston being fixed to the end of a rod 38 which is secured to the secondary bed or base 11.

General description of hydraulic controls

Referring to Fig. 8, which constitutes a diagram of the hydraulic controls of the apparatus by which the direction and rate of feed of the hydraulic actuating fluid to the opposite ends of the cylinder is controlled, it will be noted that the hydraulic actuating fluid is drawn from a suitable tank or sump S by a low pressure pump 42 and a high pressure pump 44. The low pressure pump is provided with a pressure governing valve 46, while the high pressure pump 44 is provided with a similar governing valve 48 designed to operate at a higher pressure. The discharge of the low pressure pump, as regulated by its regulator 46, is supplied to a conduit 50 which is at all times in communication with the rod end of the motor cylinder 34. It will be noted that the effective area of the piston 36 is substantially twice that of the rod 38, and this type of motor is thus customarily referred to as a "two to one" differential motor.

Similarly, the discharge of the high pressure pump 44, as controlled by its pressure regulator 48, is supplied to a conduit 52. A governor valve 54 is adapted to control the pressure of the hydraulic fluid supplied through the conduit 52, in a manner hereinafter to be described, to maintain a constant differential pressure across the adjustable apertures of feed regulating valves 58 and 60.

The admission of hydraulic fluid to the opposite ends of the motor cylinder 34 is controlled by a directional valve 62 which is movable to its extreme right and left hand positions by a reciprocatory hydraulic motor 64. The latter motor is controlled by a solenoid operated valve mechanism 66 operated by a rapid reverse solenoid 68 and a rapid forward solenoid 70. The hydraulic fluid for actuating the motor 64, under the control of its solenoid valve mechanism 66, is supplied from the conduit 50 through a pressure reducing valve 72.

A feed selector valve 74 is controlled in response to the position of the directional valve 62, and is arranged to render either of the two feed regulating valves 58 or 60 effective to control the rate at which hydraulic actuating fluid is supplied to the head end of the motor cylinder 34.

Figure 2:
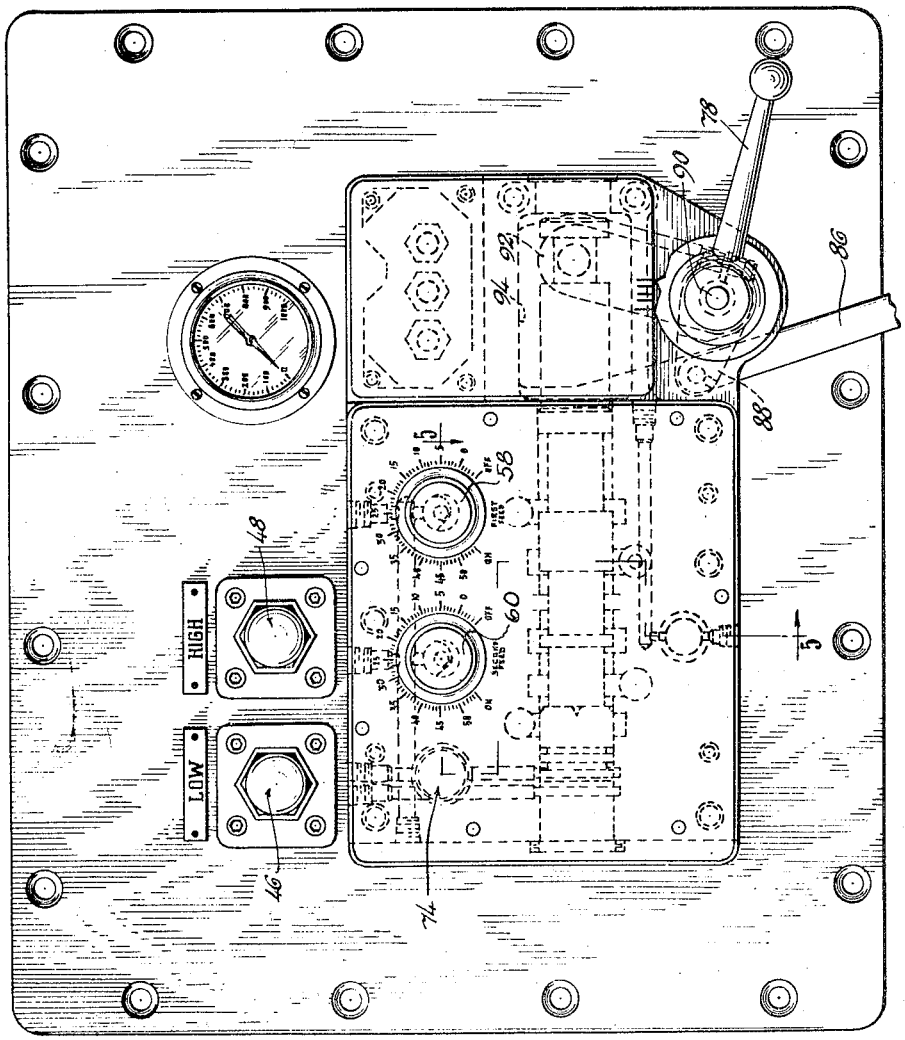
Fig. 2 is a side elevational view of the hydraulic control panel.

The reciprocatory valve part 76 of the directional valve 62 is adapted to be operated not only by the hydraulic motor 64, but may also be operated manually by a handle 78 (Fig. 2) and may be operated automatically by the dogs 30, 31 (Fig. 1) which are engageable with a roller 80 carried at one end of a lever 82, and by the engagement of the dog 32 with a roller 84 mounted on the other end of the lever 82.

The lever 82 (Figs. 1 and 3) is pivoted at its center and is connected by a link 86 and arm 88 with a pivotally mounted shaft 90 to which the handle 78 is secured. An arm 92 (Figs. 2 and 3), which is also secured to the shaft 90, swings through a limited angle in a suitable recess 94 formed in a valve plate 96. A pin 98 extends through the arm 92, the outwardly projecting ends thereof forming pivotal mountings for yokes 100 and 101. The yoke 100 fits in a suitable annular groove formed near the end of the valve member 76 of the directional valve 62, while the yoke 101 engages in a suitable annular recess formed in the rod connecting the pistons 104, 105, of the directional valve shifting motor 64.

As shown in Fig. 3, the arm 92 is adapted to be held in any one of its five positions of adjustment by the engagement of a spring pressed ball detent 106 in any one of five arcuately spaced conical recesses 108 formed in the arm 92. This detent serves to center and hold the directional valve in the position to which it has been moved.

The relief valves 46 and 48 may be of any well known construction, such as shown, for example, in our prior Patent No. 2,377,720. It is preferable that they be readily adjustable for the desired relief pressure.

Directional valve

The body 110 of the directional valve 62 (Fig. 4) is provided with a plurality of annular grooves 118.1, 120.1, 112.1, 50.1, 52.1, 122.1, 114.1, and 116.1. The spool type valve member 76 has a plurality of annular grooves 124, 126, 128, 130, and 132, which are adapted to cooperate with these grooves in the body.

The valve member 76 has a passageway 134S extending axially therethrough, this passageway communicating freely at its right-hand end with the oil tank or sump S formed within the head 14. It is also provided with a diagonal passageway 124.1 connecting groove 124 to groove 50.1 in all positions of the valve.

Thus the directional valve 76 may be shifted manually by operation of the handle 78, may be shifted mechanically by the dogs 30, 31, 32, or may be shifted hydraulically by the operation of the motor 64. The valve 76 has five effective positions. In its leftmost position it causes "Return" or reverse movement of the head, in its rightmost position it causes "Advance" or forward traverse of the head, while in its intermediate positions (left to right) it effects "Stop," "Second feed," and "First feed" of the head. These five positions of the directional valve are shown in Figs. 15, 4, 16, 17, and 18, respectively. It will be clear that in the system shown in Fig. 8, the motor 64 can shift the valve 76 only between its two end positions, and that it may be moved to its intermediate positions only by the dogs 30, 31, 32, or may be moved manually to any of its five positions by operation of the handle 78. In the modified form of the invention, shown in Figs. 11 to 14, and hereinafter to be described, remotely controllable electrohydraulic means are provided for shifting the valve 76 to any one of its five positions.

Solenoid operated valves

The solenoid operated valve structure 66 for controlling the operation of the directional valve operating motor 64 is best shown in Figs. 6 and 7 as comprising a body 134 provided with coaxial cylinders 136 and 137 for the joined pistons 104 and 105, respectively. The right hand end of the cylinder 136 is closed by a plate 138 having a groove 139 which communicates with a passageway 140, while the left hand end of cylinder 137 has a passageway 142 connected thereto. A passageway 112.2 is connected to the discharge opening of the pressure reducing valve 72, the pressure in this passageway being maintained by a spring loaded pressure relief foot valve 146 (Fig. 8). In a similar manner the pressure in conduit 116 is maintained by a spring loaded foot valve 148.

The plunger of solenoid 68 is connected to a valve 150 which is normally held in the position shown in Fig. 7 by a compressed coil spring 151 to vent passageway 140 to the sump. A similar valve 152 is connected to the plunger of solenoid 70. When solenoid 68 is energized, its valve 150 is moved to connect passageways 112.2 and 140 to supply oil under pressure to the cylinder 136 to move pistons 104, 105 through a full stroke to the left (Fig. 6), the oil in the cylinder 137 escaping to the sump through passageway 142 and past valve 152, thereby positioning directional valve 76 for causing return movement of the head. Similarly, when solenoid 70 is energized, valve 152 permits flow of oil under pressure from passageway 112.2 through passageway 142 to the cylinder 137 to move the pistons 104, 105 a full stroke to the right, valve 150 permitting free flow of the oil from cylinder 136 to the sump, and moving the directional valve 76 to its rightmost position to cause the head to advance.

Feed selector valve

As shown in Figs. 4 and 5, the valve body 110 of the feed selector valve 74 is provided with a bore 156 to receive a reciprocatory three way valve member 160. This valve member is hydraulically actuated by selective application of hydraulic pressure to its end faces through passageways 118 and 120, as determined by the position of directional valve 76. When valve 160 is in its leftmost position, as shown in Fig. 5, it permits flow of oil from passageway 122 to passageway 162 and thence to the first feed regulating valve 58. The stem 164 of valve 58 has a plugged end bore 165 which communicates with a V-groove 166 of increasing depth and also communicates with passageway 114 through a suitable port and groove. The position of valve stem 164 is adjustable through an angle of somewhat less than 360° to vary the effective size of the aperture provided by the groove 166, a knob 168 keyed to the stem 164 and cooperable with suitable graduations on front panel 170, being provided for this purpose.

When the feed selector valve member 160 is moved to the right (Fig. 5) due to the application of hydraulic pressure to left hand end of cylinder 156 through passageway 118, it connects passageway 122 to a passageway 172 which leads to the adjustable V-groove aperture of second feed regulating valve 60, which is similar to the valve 58, and is effective to control the rate of flow of oil from the passageway 172 to the passageway 114.

The governor valve

The governor valve mechanism 54 comprises a valve 174 slidable in a bore 176 formed in the body 110, and forced to the right by a compressed spring 178. The valve 174 has pistons 180 and 181, formed integrally therewith. The right hand (Fig. 5) end of the bore 176 communicates with passageway 52 through a T-shaped passageway 182, the cross-portion of the latter having a headed flow metering pin 184 fitting loosely therein. The left hand end of the bore 176 is connected by passageway 114.3 with groove 114.1 and hence with conduit 114 leading to the head end of the main hydraulic motor cylinder 34. Whenever the pressure in passageway 52 (the discharge of the high pressure pump 44) exceeds the pressure in the passageway 114.3 by a predetermined amount, sufficient to compress the spring 178, the valve 174 is forced to the left (Fig. 5) to provide a by-pass (of greater cross-sectional area as the pressure differential increases) from passageway 52 to passageway 50. Thus a constant differential pressure is maintained between the pressure of the oil flowing from the high pressure regulating valve 48 and the pressure applied to the head end of cylinder 34 irrespective of the setting of the feed regulating valves 58 and 60. The valve is kept from fluttering because of the restricted passageway around the pin 184.

Operation

Assuming that the motors driving the pumps 42 and 44 have been started by the usual controls, and assuming that the head is back (fully returned position), the limit switch 39 will be in operated condition, and "Advance" contactor 186 and "Return" contactor 187 will be open. The operator then either closes push button contactor 186, or manually moves the handle 78 to "Advance" position, thus moving the directional valve 76 to the position in which it is shown in Fig. 4. When the push button contactor 186 is closed solenoid 70 is energized to cause the motor 64 to move to its right-most position. When the directional valve is in this position oil under pressure may flow freely from the low pressure supply passageway 50 to the annular groove 114.1, and hence through the conduit 114 to the head end of the motor cylinder 34, advancing the head 14 until the roller 80 engages the first feed dog 39 (Fig. 1), whereupon the lever 82 will be swung counterclockwise, and through the link 86 and arm 88 rotate the shaft 90 counterclockwise and thus move the directional valve 76 to the left to the position in which it is shown in Fig. 18.

Under these circumstances, oil from the groove 50.1 flows through the passageway 124.1 and groove 124 in the directional valve 76 to the annulus 120.1 and hence via passageway 120 to the right-hand (Fig. 5) end of the feed selector valve cylinder 156, thereby forcing the piston valve member 160 therein to the left. Oil from the high pressure discharge line 52 (Fig. 18) may then flow freely from the groove 52.1 to the groove 122.1 and conduit 122 to the passageway 162 (Fig. 5) to the first feed regulating valve 58, flowing through the adjustable aperture groove 166 thereof and passageway 114 to the head end of the hydraulic motor cylinder 34 (Fig. 8). At the same time, the directional valve cuts off the flow between annulus 50.1 and 114.1, so that the only path by which oil under pressure may flow to the head end of motor cylinder 34 is through the adjustable aperture feed regulating valve 58. The hydraulic motor 34, 36 will therefore advance the head 14 at a feed rate dependent upon the setting of the first feed regulating valve 58. During this advance of the head 14 oil discharged from the rod end of the motor cylinder 34 flows into the low pressure supply conduit 50, which is possible because of the increased pressure in the rod end of the cylinder due to the difference in the effective areas of the two faces of piston 26.

Such movement will continue until the roller 80 engages the second feed dog 31 (Fig. 1), whereupon the directional valve 76 will be moved further to the left to the position in which it is shown in Fig. 17. When in this position, oil under pressure may flow freely from the annular groove 50.1 through passageway 124.1, groove 124, annulus 118.1, and passageway 118, to the left-hand (Fig. 5) end of the feed selector valve cylinder 156, to force the valve member 160 thereof to the right and thereby connect the high pressure supply groove 52.1 past the directional valve, annular groove 122.1, passageways 122 and 172, to the second feed regulating valve 60. Rightward movement of valve member 160 is permitted since the oil in the right-hand end of cylinder 156 may escape to the sump through passageway 120, groove 126, passageways 126.1 and 134S. The oil under pressure flowing through the aperture provided by the V-groove 166 then flows through passageway 114 to the head end of the motor cylinder 34, causing the head 14 to advance at the second feed rate, determined by the adjustment of the second feed regulating valve 60. Any leakage past the feed regulating valve 58 and 60 drains to the sump through branched passageway 167S (Fig. 5).

The head will thus continue advancing at the second feed rate until the actuator for the return limit switch 41 (Fig. 10) engages the return dog 37, thereby closing contactor 187 (Fig. 9) to energize solenoid 68 (Fig. 8). Energization of this solenoid permits flow of oil under relatively low pressure from the pressure reducing valve 72 through the passageway 112.2, past the valve 150, through the passageway 140 to the right-hand (Figs. 7 and 8) end of cylinder 136, to force the pistons 104, 105 to the left, and hence move the directional valve to its leftmost position as shown in Fig. 15. When in this position, the directional valve cuts off annular groove 122.1 and permits flow from the head end of motor cylinder 34 to the annular 114.1 and through annulus 116.1 and conduit 116 to the pressure retaining foot valve 148. Since the rod end of hydraulic motor cylinder 34 is at all times connected to the low pressure supply line 50, the head is moved in the return direction because the oil in the head end of the cylinder 34 may flow relatively freely therefrom past the low back pressure imposed by the foot valve 148. During this return movement the discharge from the pump 44 mingles with that from the pump 42 since the respective discharge conduits 52 and 50 of these pumps are connected by groove 130 of directional valve 76 (Fig. 15). The head 14 thus continues its return movement until the actuator for the limit switch 39 engages the stop dog 35, to open the return contactor 187.

As the head returns to the position in which the limit switch 39 is actuated, the roller 84 on the lever 82 engages the stop dog 32 (Fig. 1) and swings the lever 82 clockwise and thus rotates the shaft 90 clockwise to move the directional valve to the stop position in which it is shown in Fig. 16. It will be noted that in this position the annular groove 114.1 remains in communication with the annular groove 116.1, so that the head end of the motor cylinder 34 is not subjected to substantial pressure, and the head will come to rest.

If the machine is to operate in a completely automatic manner, the operation of the stop limit switch 39 (or other switch which is automatically closed when the machine is in condition to start a second cycle) will cause closure of the advance contactor 186 to energize advance solenoid 70, and by operation of its valve 152, cause flow of hydraulic fluid under pressure to the left-hand end of cylinder 137 to cause the directional valve positioning motor 104, 105 to move a full stroke to the right, and thereby position the directional valve 76 in the "Advance" position in which it is shown in Fig. 4.

It will be noted that during the first feed and second feed, the governor valve 54 is effective to maintain a constant pressure differential between the pressure in the high pressure conduit 52 and the pressure in the head end of motor cylinder 34, (as described above in the paragraph headed "The governor valve") so that the force tending to move the head 14 will be constant, irrespective of the feed rates determined by the adjustments of the first and second feed regulating valves 58 and 60.

At any time during the operating cycle of the machine, the operator may shift the directional valve to any desired position by means of the handle 78, provided that none of the dogs 30, 31, or 32 is in interfering position. The directional valve will remain in such manually adjusted position until the head moves to a position in which one of the dogs 30, 31, 32, 35, or 37 becomes effective, after which the machine will operate under the control of the set dogs. This possibility of overriding manual control during an otherwise automatic or semi-automatic cycle is of particular value when setting up the machine.

At any time, by the closure of a contactor 188 (Fig. 9) and opening contactor 189 by means of a push button, the machine head 14 may be caused to return to its back position. The push button for the operation of these contactors is preferably located conveniently to the operator's station so that it may be quickly operated upon breakage of a tool or the occurrence of other untoward incidents which requires that the normal operating cycle be interrupted.

*Modified form of directional valve positioning motor*

Instead of utilizing the motor 64 and handle 78 to position the directional valve 62, this positioning may be accomplished by an electro-hydraulic control mechanism shown in Figs. 11 to 14, inclusive.

In this form of control, five solenoids 190, 191, 192, 193, and 194 (Fig. 13) are employed, the solenoid 190 when energized causing the directional valve to be positioned for advance of the head, the solenoid 193 for controlling return movement of the head, the solenoid 194 to cause the head to stop, the solenoid 191 to cause first feed, and the solenoid 192 to cause second feed. The solenoids 190 to 194 have armatures 198 pivotally connected to similarly constructed valves 200, 201, 202, 203, and 204, respectively. The effective positions of these valves are best shown in Fig. 14.

As best shown in Fig. 12, each of the valves 200 to 204 cooperates with a cylindrical seat 206 to cut off communication between chambers 207 and 208, each of the valves 200 to 204 being provided with a head 209 operable in a counterbore 210 formed in a valve block 211, and is normally held in closed position by a spring 212 compressed between the end of the counterbore 210 and the head 209. Thus, when the solenoid is energized, the plunger is raised, as shown in the broken sectional portion of Fig. 12, to permit the flow of hydraulic actuating fluid from the chamber 207 to the chamber 208, and when the solenoid is deenergized, the valves 200 to 204 cut off the flow by cooperation with the cylindrical seat 206.

The block 211, which forms a suitable mounting for the solenoids 190 to 194, is suitably secured to a motor block 213 which is provided with a pair of coaxial bores 214 and 215 forming the cylinders for pistons 216 and 217, respectively, these pistons being preferably integral, having a reduced diameter rod portion 218 connecting them. A yoke 220 (similar to the yoke 100—101 previously described) forms a non-yielding operating connection between the operating pistons 216, 217 of the motor and the directional valve 64.

The construction and operation of the modified form of hydraulic motor may be clearly understood by reference to Fig. 14. As shown in this figure, the hydraulic operating fluid, such as oil, under pressure, is supplied through a passageway 221 which is connected by flow restricting passageways 222 and 223 with passageways 224 and 225, respectively. The passageway 224 communicates with the left-hand (Fig. 14) end of cylinder 214, while passageway 225 communicates with the right-hand end of the cylinder 215 through a groove 226 formed in a closure cap 227 suitably secured over the right-hand end of the cylinder 215.

The hydraulic fluid under pressure supplied through the passageway 221 will act equally on both pistons 216 and 217, and the latter will therefore remain stationary. When the forward solenoid 190 is energized, its valve 200 opens to permit escape of the oil from the right-hand end of cylinder 215 to the sump, and as a result, the pistons 216, 217 will move to the position in which they are shown in Fig. 14. Similarly, when the reverse solenoid 193 opens its valve 203 to permit escape of the oil from the left-hand end of the cylinder 214, the pistons 216, 217 will thus move to their leftmost positions and correspondingly move the directional valve 64. When the first feed valve 201 is operated by its solenoid 191, the pistons 216, 217 will move to a position such that the ends thereof just cover ports 231 and 231.1 which are connected by a suitable passageway 231.2 with the inlet of the valve 201, the outlet of this valve being connected to the sump to permit free discharge of oil thereto. When the second feed solenoid 192 is energized to open its valve 202, the pistons 216, 217 will be positioned such that they just cover ports 232 and 232.1 which are connected by a passageway 232.2 with the inlet of valve 202 and the directional valve 64 will therefore be moved to a position to cause the head of the machine to advance at the second feed rate.

When the solenoid 194 is energized to open its valve 204, the pistons 216, 217 will move to a position in which they just cover ports 234 and 234.1. The latter ports are connected by suitable passageways 234.2 to the inlet of valve 204.

It will therefore be seen that by selective completion of the circuits for energization of the solenoids 190 to 194, the valves 200 to 204 are respectively operated to cause the motor pistons 216, 217 to move to a position determined by which of the five solenoids is energized, and that the directional valve 64 will be correspondingly positioned. The circuits for the solenoids 190 to 194 may be completed by remotely positioned push button operated switches, and the machine head will move in the desired direction and at the desired speed or stop, depending upon which of the push button switches is operated. At the same time, misoperation of the machine will be prevented, due to the fact that the dogs 30, 31, 32, 35, and 37 will be effective to change the setting of the directional valve. Thus, for example, if the solenoid 190 is energized to open its valve 200 to secure advance movement of the head, while the dog engaging roller 80 (Fig. 1) is intermediate the dogs 30 and 31, the head will advance at the rapid rate until the roller 80 strikes the dog 31, whereupon the directional valve will be moved to its second feed position and will continue such movement until the limit switch 41 is operated by the reverse dog 37 (Fig. 10).

The directional valve positioning motor shown in Figs. 11 to 14, may be substituted for the hand lever 78, or may be provided as an additional means for selectively positioning the directional valve 76. The use of this positioning motor for the directional valve is of decided advantage when the operator is setting up the machine for a particular operation, and is also of convenience in emergencies, as when a tool breaks, since it enables the operator rapidly to stop the machine and retract the tools.

While we have shown and described preferred embodiments of our invention, it will be apparent that numerous variations and modifications thereof may be made without departing from the underlying principles of the invention. We therefore desire, by the following claims, to include within the scope of the invention all such variations and modifications by which substantially the results of our invention may be obtained through the use of substantially the same or equivalent means.

We claim:

1. In a hydraulic control apparatus for a machine tool having a reciprocatory hydraulic motor, the combination of a source of hydraulic actuating fluid under pressure, a plurality of adjustable aperture valves connected to the motor to control the rate of flow of hydraulic fluid thereto, a valve device for supplying hydraulic fluid under pressure to a selected adjustable aperture valve, a multi-position directional valve controlling the positioning of said selector valve device, a second hydraulically operated motor for shifting said directional valve between its extreme positions, electromagnetically operated valve means for controlling the supply of hydraulic fluid from said source by said second hydraulic motor, means operated by relative movement of the machine parts to cause selective energization of said electromagnetic means, and means for maintaining a constant differential pressure between the hydraulic fluid flowing from the adjustable aperture valves and the pressure of the hydraulic fluid supplied by the source.

2. In a hydraulic control apparatus for a machine tool having a reciprocatory piston and cylinder motor, the combination of a source of hydraulic actuating fluid under pressure, a plurality of adjustable aperture valves connected to the cylinder of the motor to control the rate of flow of hydraulic fluid thereto, a selector valve for supplying hydraulic fluid pressure to a selected adjustable aperture valve, a multi-position directional valve hydraulically controlling the positioning of said selector valve, a hydraulically operated positioning motor for shifting said valve between its extreme positions, electromagnetically operated valve means for controlling the supply of hydraulic fluid from said source to said positioning motor, and means operated by relative movement of the machine parts to cause selective energization of said electromagnetic means.

3. In a hydraulically controlled machine tool having a movable part and a reversible hydraulic motor for moving the part, the combination of a pair of adjustable aperture valves for controlling the rate of flow of hydraulic fluid to the hydraulic motor, a directional valve, a feed selector valve controlled by the directional valve and operable to control the flow of hydraulic fluid to one or the other of the aperture valves to select the feed rate, and manually operable means to position the directional valve.

4. In a hydraulic control apparatus for a machine tool having a reciprocatory hydraulic driving motor, the combination of a source of hydraulic actuating fluid under pressure, a plurality of adjustable aperture valves for controlling the rate of flow of the hydraulic fluid from the source to the motor, a valve device for supplying hydraulic fluid under pressure to a selected adjustable aperture valve, and means for maintaining a constant differential pressure between the hydraulic fluid flowing from the adjustable aperture valves and the pressure of the hydraulic fluid supplied by the source.

5. In a hydraulic control apparatus for machine tools having a hydraulic motor for relatively moving the tool and the workpiece, the combination of a source of hydraulic fluid under pressure, a pair of adjustable aperture flow restricting valves connected to the hydraulic motor to operate the latter in the direction of feeding the tools into the work, a selector valve operable to connect one or the other of said adjustable aperture valves to the source of fluid under pressure, and a pressure governor device effective to maintain a constant difference between the pressure of the source and the pressure of the fluid flowing from the selected adjustable aperture valve to the hydraulic motor.

6. In a control apparatus for machine tools having a hydraulic motor for relatively moving the tool and the workpiece, the combination of a source of hydraulic fluid under pressure, a directional valve to control the supply of hydraulic fluid from the source to the motor and the discharge of hydraulic fluid therefrom, said directional valve having a plurality of control positions, a hydraulic actuator having a movable part rigidly connected to the movable part of the directional valve, means to control the actuator to cause the directional valve to be moved to either of its extreme control positions, and means responsive to the relative position of the tool and workpiece for shifting the movable part of the directional valve to its intermediate control positions.

7. In a hydraulic control apparatus for a machine tool having a main reciprocatory piston and cylinder motor, the combination of a source of hydraulic actuating fluid under pressure, a plurality of adjustable aperture valves connected to the cylinder of the motor to control the rate of flow of hydraulic fluid thereto, a hydraulically operated selector valve for supplying hydraulic fluid under pressure to a selected adjustable aperture valve, a multi-position directional valve hydraulically controlling the positioning of said selector valve and in part determining the direction and speed of operation of the main motor, a hydraulically operated positioning motor mechanically connected to the directional valve for shifting the latter between its extreme positions respectively to cause advance and return movement of the main motor, and means operated by relative movement of the machine parts to cause selective operation of said positioning motor.

8. In a hydraulic control apparatus for a machine tool having a reciprocatory hydraulic motor, the combination of a source of hydraulic actuating fluid under pressure, a plurality of adjustable aperture valves connected to the motor to control the rate of flow of hydraulic fluid thereto, a valve device for supplying hydraulic fluid under pressure to a selected adjustable aperture valve, a multi-position directional valve controlling the positioning of said selector valve device, a second hydraulically operated motor mechanically connected to said directional valve for shifting the latter between its extreme positions thereby to control the operation of the valve device, means for controlling the supply of hydraulic fluid from said source to said second hydraulic motor, selectively set means operated by relative movement of the machine parts to cause operation of said controlling means in a predetermined manner, and means for maintaining a constant pressure difference between the hydraulic fluid flowing from the adjustable aperture valves and the hydraulic fluid supplied by the source.

9. In a control apparatus for a machine tool having a hydraulic motor for relatively moving the tool and the work, the combination of a source of hydraulic fluid under pressure, a directional valve having a reciprocable valve part movable to any one of a plurality of effective positions, hydraulic actuating means for selectively positioning the movable part of the directional valve in any one of its effective positions, said means comprising a pair of aligned cylinders, a pair of rigidly connected pistons reciprocable in the cylinders respectively, said pistons having opposed faces and said cylinders having a plurality of ports arranged in pairs with one port of each pair in each of the cylinders, and with the ports of a pair spaced apart an overall distance substantially equal to the distance between the opposed faces of the pistons, means including restricted passageways respectively connecting the opposite ends of the cylinders to the hydraulic pressure source, selectively operable valves for relatively freely venting the opposite ends of the cylinders respectively, and additional selectively operable valves for relatively freely venting the ports in the cylinders, there being one of the last named valves for each pair of ports.

10. In a control apparatus for machine tools having a hydraulic motor for relatively moving the tool and the workpiece, the combination of a source of hydraulic fluid under pressure, a directional valve to control the supply of hydraulic fluid from the source to the motor and the discharge of hydraulic fluid therefrom, said directional valve having a plurality of control positions in part determinative of the steps in the operating cycle to be performed by the hydraulic motor, a hydraulic actuator having a movable part rigidly connected to the movable part of the directional valve, means to control the actuator to cause the directional valve to be moved to either of its extreme control positions thereby to cause respectively return and advance movement of the hydraulic motor, a mechanical actuating means responsive to the relative position of the tool and workpiece for shifting the movable part of the directional valve to its intermediate control positions thereby respectively to cause first feed, second feed and stopping of the hydraulic motor, and manually operable means to move the movable part of the directional valve to a selected position without interfering with the subsequent operation of the mechanical actuating means.

11. In a hydraulic control apparatus for a machine tool having a reciprocatory hydraulic driving motor comprising a cylinder, and a piston and piston rod reciprocable therein; the combination of a source of hydraulic actuating fluid under relatively high pressure, a source of hydraulic actuating fluid under relatively low pressure, connected to the rod end of the motor cylinder, a plurality of adjustable aperture valves for controlling the rate of flow of the hydraulic fluid from the high pressure source to the head end of the motor, a valve device for controlling the supply of hydraulic fluid from the high pressure source to a selected adjustable aperture valve, and means for maintaining a constant differential pressure between the hydraulic fluid flowing from either of the adjustable aperture valves and the pressure of the hydraulic fluid supplied by the high pressure source.

ROBERT A. SCHAFER.
RALPH B. RODAL.

REFERENCES CITED

The following references are of record in the file of this patent:

UNITED STATES PATENTS

| Number | Name | Date |
|---|---|---|
| 1,097,983 | McNulta | May 26, 1914 |
| 2,000,553 | Alden | May 7, 1935 |
| 2,005,018 | West et al. | June 18, 1935 |
| 2,271,615 | Bauer | Feb. 3, 1942 |
| 2,299,851 | Schafer et al. | Oct. 27, 1942 |
| 2,307,544 | Robinson | Jan. 5, 1943 |
| 2,318,855 | Hayden | May 11, 1943 |
| 2,375,255 | Snader et al. | May 8, 1945 |

Certificate of Correction

November 1, 1949

Patent No. 2,486,988

ROBERT A. SCHAFER ET AL.

It is hereby certified that errors appear in the printed specification of the above numbered patent requiring correction as follows:

Column 10, line 36, for "by said" read *to said*; line 51, after "fluid" insert *under*; column 11, line 75, for "corrected" read *connected*; column 12, line 54, before the word "mechanical" strike out *a*;

and that the said Letters Patent should be read with these corrections therein that the same may conform to the record of the case in the Patent Office.

Signed and sealed this 4th day of April, A. D. 1950.

[SEAL]

THOMAS F. MURPHY,
*Assistant Commissioner of Patents.*